(12) United States Patent  (10) Patent No.: US 9,219,617 B2
Newton  (45) Date of Patent: Dec. 22, 2015

(54) IP-CLOSED CIRCUIT SYSTEM AND METHOD

(75) Inventor: Michael Newton, Northwich (GB)

(73) Assignee: AD Group, Warrington (GB)

(*) Notice: Subject to any disclaimer, the term of this patent is extended or adjusted under 35 U.S.C. 154(b) by 436 days.

(21) Appl. No.: 13/097,645

(22) Filed: Apr. 29, 2011

(65) Prior Publication Data

US 2011/0292206 A1 Dec. 1, 2011

Related U.S. Application Data

(60) Provisional application No. 61/378,171, filed on Aug. 30, 2010, provisional application No. 61/329,860, filed on Apr. 30, 2010.

(51) Int. Cl.
*H04N 7/18* (2006.01)
*H04L 12/46* (2006.01)

(52) U.S. Cl.
CPC .................................. *H04L 12/4641* (2013.01)

(58) Field of Classification Search
USPC ............................ 709/219; 348/143, E07.085
See application file for complete search history.

(56) References Cited

U.S. PATENT DOCUMENTS

| | | | |
|---|---|---|---|
| 6,337,863 B1* | 1/2002 | Nair et al. | 370/395.53 |
| 6,741,592 B1 | 5/2004 | Edsall et al. | |
| 7,058,967 B2* | 6/2006 | Graber et al. | 725/108 |
| 7,792,047 B2* | 9/2010 | Gallatin et al. | 370/249 |
| 2003/0081121 A1* | 5/2003 | Kirmuss | 348/143 |
| 2006/0034292 A1 | 2/2006 | Wakayama et al. | |
| 2006/0136575 A1* | 6/2006 | Payne et al. | 709/219 |
| 2006/0146835 A1* | 7/2006 | Homchaudhuri et al. | 370/395.53 |
| 2007/0076094 A1* | 4/2007 | Dickerson et al. | 348/143 |
| 2007/0180485 A1* | 8/2007 | Dua | 725/114 |
| 2007/0204350 A1* | 8/2007 | Juszkiewicz | 726/30 |
| 2007/0288974 A1* | 12/2007 | Creamer et al. | 725/105 |
| 2008/0259924 A1* | 10/2008 | Gooch et al. | 370/392 |
| 2008/0316309 A1* | 12/2008 | Roper | 348/143 |

* cited by examiner

*Primary Examiner* — Christopher S Kelley
*Assistant Examiner* — Ana Picon-Feliciano
(74) *Attorney, Agent, or Firm* — Goodwin Procter LLP

(57) ABSTRACT

The invention relates to a switching module for creating and operating secure networks of data sources and monitoring stations, and for providing controlled access to the data sources and monitoring stations from public networks.

37 Claims, 11 Drawing Sheets

IP-CLOSED CIRCUIT SYSTEM AND METHOD

CROSS-REFERENCE TO RELATED APPLICATIONS

This application claims priority to U.S. Provisional Application Ser. No. 61/378,171, filed Aug. 30, 2010, and U.S. Provisional Application Ser. No. 61/329,860 filed Apr. 30, 2010, the disclosures of which are incorporated herein by reference in their entireties.

TECHNICAL FIELD

The invention relates to IP networks, and in particular to closed-circuit video-over-IP networks.

BACKGROUND

Closed Circuit Television (CCTV) typically works on the basis that conventional analog video cameras can be deployed for security and surveillance purposes via point to point analog connections, forming a closed, secure network of the deployed cameras. Transmission of video over TCP/IP networks can be facilitated, however, using IP cameras. The use of TCP/IP networks can facilitate high-resolution transmission, thereby improving quality of the transmitted images, and provide the ability to deploy cameras over a wide geographical area. TCP/IP networks can also be used to create closed circuit (CC) systems that interconnect other IP-enabled end-point devices. Examples of such devices include access-control readers that can permit access to a building at various entrances, and alarms that may monitor a certain condition (e.g., presence of gases) and alert a receiving station connected via a TCP/IP network. In the following discussion, references are made to CCTV systems for the ease of discussion. It should be understood, however, that TCP/IP and IP-CC systems are not limited to TV systems, and can be configured to include various end-point devices (e.g., access-control readers, alarms, etc.).

The use of TCP/IP networks, however can present challenges to the management and operation of CCTV networks, because the transmitted video data can be easily intercepted by known IP hacking techniques. The possibility of hacking makes CCTV-IP networks insecure. The identification and configuration of multiple devices, such as video servers and IP cameras, which are to be used as part of a CCTV surveillance system/video monitoring system, can also be difficult when deployed on a TCP/IP network. This is because some approaches require an installer to manually identify, one-by-one, each of the devices connected on the network through the understanding of the Media Access Control (MAC) address of the device when it appears on the Dynamic Host Configuration Protocol (DHCP) server. The DHCP server would then allocate an IP address to the device, or the IP address must be allocated manually. Only after such identification of a device and allocation of an IP address, the device can be located and controlled.

Moreover, an IP cabling endpoint, where a camera can be connected to a cable, may be outside a protected zone. A protected zone can be a region to which it may be difficult for an intruder to gain access, making it difficult for the intruder to tamper with a camera. Outside a protected zone (e.g., housing at a distance in the back of a building), however, a intruder can gain access to the IP cabling endpoint and may install a different, unauthorized device. The unauthorized device can send fake video data to a monitoring station in the TCP/IP network, making the network vulnerable. Also, as the elements of the system are often installed in difficult to service locations, such as on roofs/tall buildings or CCTV camera poles, it may be advantageous to the installer if the devices can be identified and IP configured without the need to hire platforms/cherry pickers in order to access the devices.

Some methods (e.g., DHCP Option 82) can allocate IP addresses to devices such as IP cameras, and may be configured such that one port is associated with one allocated IP address. Thus, using DHCP Option 82, by permitting communication among devices corresponding to only a subset of the allocated IP addresses a secured network can be created. Under DHCP Option 82, however, configuring each port to only a single IP address can be cumbersome. Moreover, the DHCP Option 82 does not provide authorization of IP addresses prior to permitting communication between two devices. Therefore, the step of authorizing IP addresses and thus providing a secured network must implemented in addition to using the DHCP Option 82. Operating a secured network according to these methods presents yet another problem. For example, a device in the network is not uniquely identifiable by its own identifier such as a Media Access Control (MAC) address. If an unauthorized device replaces an authorized device connected to the network, the unauthorized device would simply use the IP address allocated to the authorized device, and thus would appear to be authorized to the other network components.

Additionally, configuring a secured network using these methods may require a specific IP address allocation method that may not be compatible with other allocation methods employed by the network. Finally, configuring the ports of a network switch to access the IP addresses and the associated identifiers, so as to route the received data frames based on the identifiers can be cumbersome for a large number of ports.

SUMMARY OF THE INVENTION

In various embodiments, the present invention features a closed IP network of devices which connect to one or more control systems in a point-to-point manner, creating a secure network of these devices. As used herein, "closed" means only devices configured to be included in the IP network can directly exchange data with one another.

The invention solves the problem of the difficulty in configuring multiple devices and cameras on TCP/IP networks, due to their locations, by creating a point to point, plug and play configuration. This is achieved, in part, by allocating devices (e.g., cameras) to network ports and assigning IP addresses to the devices automatically, and by allowing devices which are to be deployed as part of a CCTV surveillance system to be automatically paired, in a deterministic manner, with the respective server/recording device without any intervention by an installer or user. A deterministic and device specific data management can enable securing a TCP/IP network.

In particular, switching modules that have pre-allocated network ports may be built into the control equipment. These switches can tag received data frames, thereby allowing integration of layer 3 switch capabilities into an application program. Then, the application program can automatically allocate devices or "endpoints" to ports of the switch, and associate a device connected to a port to the control equipment. This may be achieved without the need for undertaking a lengthy and flaw ridden process of finding the relevant device's manually or DHCP allocated IP address before it is possible to connect the device to the control/recording equipment. As used herein, "tag" means to modify a data frame by adding certain information to the data frame or removing such information from a data frame.

Using the association between ports, devices/endpoints, and control equipment, the devices and the control equipment can communicate with one-another securely, creating a unique topography of devices which may be a secure network within another TCP/IP network. As used herein, a secure network indicates that the endpoint or a device connected to a port is secured, i.e., the association between a port and a device connected to the port cannot be altered. As a result, a closed IP TV network is formed in which there can exist a substantially exclusive relationship between the devices (e.g., cameras) and the control equipment. The closed IP TV network thus created can start streaming and recording video data immediately.

A switching module can thus create a fully IP based solution for both standard and high definition data/video by providing embedded IP network video recording (NVR). The IP cameras can be automatically discovered using zero configuration networking (zeroconf) or multicast domain name system (mDNS). Zeroconf is a set of techniques that automatically creates a usable IP network, without manual operator intervention or special configuration servers. The mDNS allows for automatic resolution and distribution of computer hostnames. Moreover, the switch module can provide integrated Layer 2/3 switch solutions allowing for deterministic individual camera identification by input connector.

Thus, a point to point IP network can be configured without requiring substantial effort. The configuration of IP cameras can be substantially transparent, i.e., specific knowledge of the camera's IP address or its other IP-related information may not be required substantially. This configuration may allow polymorphic streaming and advanced event handling (e.g., multimode). For example, as a higher application layer such configuration provides seamless NetVu Connected environment. The IP cameras may be substantially isolated from IP Video access using a default firewall setting, and additional firewall-setup options can allow deep integration into a client's network, while maintaining high levels of security. Thus, the switching module can provide a substantially secure and robust IP solution without requiring substantial IP expertise.

Moreover, an Integrated Camera Recorder (ICR) can provide full IP infrastructure for standard definition and megapixel pictures, video, and other data. A decentralized IP/ICR architecture can reduce central network risk, while providing powerful multi-screen, multi-stream decoders and hi-definition displays. The architecture can be a completely integrated centralized video management system (VMS).

An Integrated Camera Recorder (ICR) typically includes an Enterprise class server, local storage devices and media, e.g., solid state drives (SDD) or hard disk drives (HDD) that can be made completely independent of IP status of the camera using ATA over Ethernet (AoE) technology. As multiple cameras may store recorded data, and may provide access to such data, a single point of failure can be substantially eliminated, and high network infrastructure installation and maintenance costs, and high reliability requirements for the network can be decreased. Moreover, an ICR can facilitate on-demand viewing and management, complementary backup storage, and can transmit video data to high definition viewing workstations using a High-Definition Multimedia Interface (HDMI).

Multi-tiered storage architecture of the ICR can provide multiple resolution and storage options that may be proportionate to the storage medium. This can allow effectively balancing storage requirements and storage cost. An enterprise server embedded within the camera can provide support for alarm handling, integration and processing of meta data, and serve as a video management tool. The ICR may be flexibly integrated with Heating Ventilating and Air-Conditioning (HVAC) systems and/or building management using configuration scripts.

The invention features the deployment of Ethernet frame tagging in a new and unique manner that integrates the layer 3 switch capabilities into the video server application, itself allowing devices to deterministically discover each other securely and be allocated automatically to ports within the built-in switch. Thus, a unique topography of devices that becomes a completely secure network within another TCP/IP network can be created.

Accordingly, in one aspect, the invention relates to a switching module including a first and second port groups and a control unit for configuration of the ports in each port group. The first port group includes at least one port. Each port in the first port group is configured for connecting with a data source, and modifies a data frame transmitted by the connected data source. This is achieved by including in the data frame a unique port number assigned to the port. The port routes the modified data frame to a destination port if a unique port number assigned to the destination port is associated with the port in a routing table assigned to the port. The second port group also includes at least one port. Each port in the second port group is configured for connecting with a monitoring station and for receiving a data frame modified by one of the ports in the first port group. The control unit assigns a unique port number to each port in the first and second port groups. It also assigns a routing table to each port in the first port group. The routing table includes at least one source port number and at least one destination port number associated with each source port number in the table.

In various embodiments, the data source of the switching module includes an IP camera or an analog camera and a codec. The data source can be an encoder, and a device connected to the encoder can be an IP camera, an analog camera, or an SDI camera. The data source may also be an access-control reader or an alarm. The monitoring station may include means for viewing the data frames received through the connected port and/or means for storing the data frames received through the connected port. In some embodiments, the switching module further includes a third port group including at least one port. Each port in the third port group can be configured for connecting with a private network of computing devices. The control unit may be configured for assigning a unique port number to each port in the third port group. The control unit may also enable communication of data frames between ports in the third group, a port in the third port group and a port in the first or second port groups, and between a port in the third group and the control unit.

In some embodiments, the switching module further includes a fourth port group including at least one port. Each port in the fourth port group can be configured for connecting with a public network of computing devices. The control unit may be configured for assigning a unique port number to each port in the fourth port group. The control unit may also enable communication of data frames between ports in the fourth port group, and between a port in the fourth group and the control unit. The control unit may, however, prevent communication of data frames between a port in the fourth port group and a port in the first or second port groups.

In another aspect, the invention relates to a video device that includes a camera, a storage unit, and a server. The storage unit is in communication with the camera for storing data frames recorded by the camera. The server controls the camera and the storage unit, and provides access to and transmission of the stored data frames.

In various embodiments, the video device may further include a port unit configured for receiving a unique port number. The port unit can modify a data frame transmitted by the camera by including in the data frame the unique port number. Additionally or alternatively, the video device may further include a switching module. The switching module may include a first and second port groups and a control unit for configuration of the ports in each port group. The first port group includes at least one port. Each port in the first port group is configured for connecting with a data source, and it modifies a data frame transmitted by the connected data source. This is achieved by including in the data frame a unique port number assigned to the port. The port routes the modified data frame to a destination port if a unique port number assigned to the destination port is associated with the port in a routing table assigned to the port. The second port group also includes at least one port. Each port in the second port group is configured for connecting with a monitoring station, and for receiving a data frame modified by one of the ports in the first port group. The control unit assigns a unique port number to each port in the first and second port groups. It also assigns a routing table to each port in the first port group. The routing table includes at least one source port number and at least one destination port number associated with each source port number in the table. The camera is connected to the switching module using one port in the first port group.

In some embodiments, the server of the video device may receive control information via the port using whichever camera is connected. In response to the received control information, the server can control the control unit. The first port group of the video device may also include at least one secondary port. A data source can be connected to one of the secondary ports. The data source can be a video camera.

In another aspect, the invention related to a method for operating an IP network. The network may include a switching module that includes a first port group including at least one port, a second port group including at least one port, and a control unit. The method includes assigning from the control unit a unique port number to each port in the first and second port groups, and assigning from the control unit each port in the first port group a routing table including at least one source port number and at least one destination port number associated with the at least one source port number. The method also includes connecting a data source to the at least one port of the first port group, authorizing a data frame transmitted by the data source, and modifying the authorized data frame. The modified data frame may be to a destination port if a unique port number assigned to the destination port is associated with the port in a routing table assigned to the port. The method further includes connecting a monitoring station to the at least one port of the second port group and receiving a data frame modified by at least one port in the first port group at the monitoring station.

In various embodiments, authorizing a data frame in the method includes comparing a device source number in the data frame with the unique port number. The method may further include the steps of preventing transmission of an unauthorized data frame, and communicating the unique port number of the port receiving the unauthorized data frame to the control unit for blocking access through the port. The unique port number a port in the first port group may include a device source number of the data source connected to the port. The unique port number of a port in the second port group may include a device source number of the monitoring station connected to the port.

In some embodiments, the method of operating an IP networks also includes storing at a port in the first group a security parameter associated with the data source connected to the port. The security parameter can be a unique identifier associated with the connected device and/or a key generated by the port or switch based on the unique identifier or another property of the connected device. The key may be randomly generated and may also be used to encrypt the data frames. The unique identifier may also be the number of data frames received and/or transmitted during a certain period. The method also includes storing at the data source a corresponding security parameter, that may be the unique identifier, key, or the corresponding counts as described above.

The method further includes receiving and comparing the corresponding parameter with the security parameter stored at the port to determine if an unauthorized device is present at the port. Finally, the method includes disabling the port for a predetermined period if the comparison fails (i.e., an unauthorized port is determined to be present), to prevent data transmission from the unauthorized device. When an unauthorized port is determined to be present, a violation may also be reported to an administrator by sending an alert such as an email or alarm. The report may also include the untrusted data frames received at the port at which the presence of an unauthentic device was detected.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
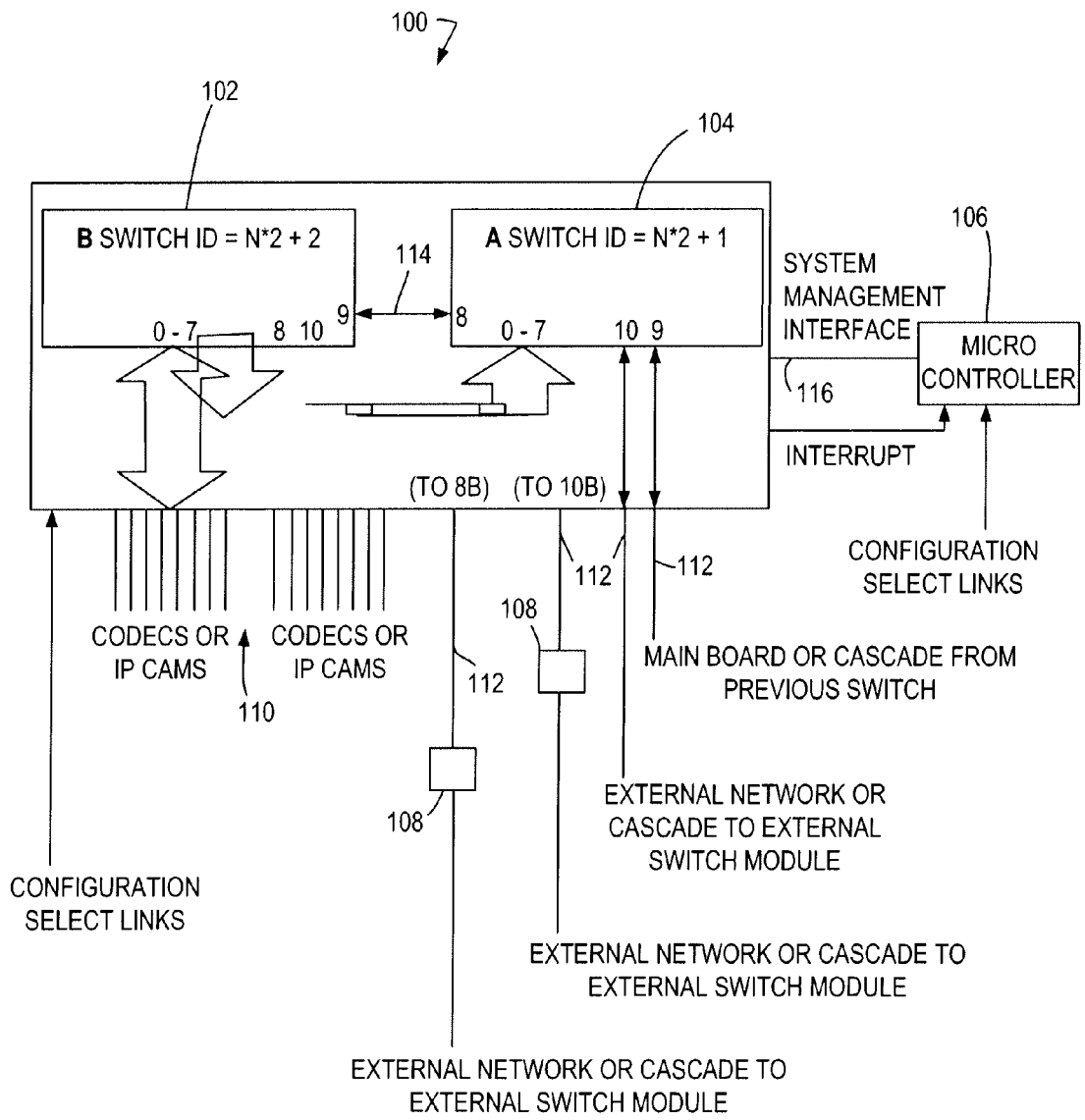
FIG. 1 schematically shows a switching module comprising two switches.
Figure 2:
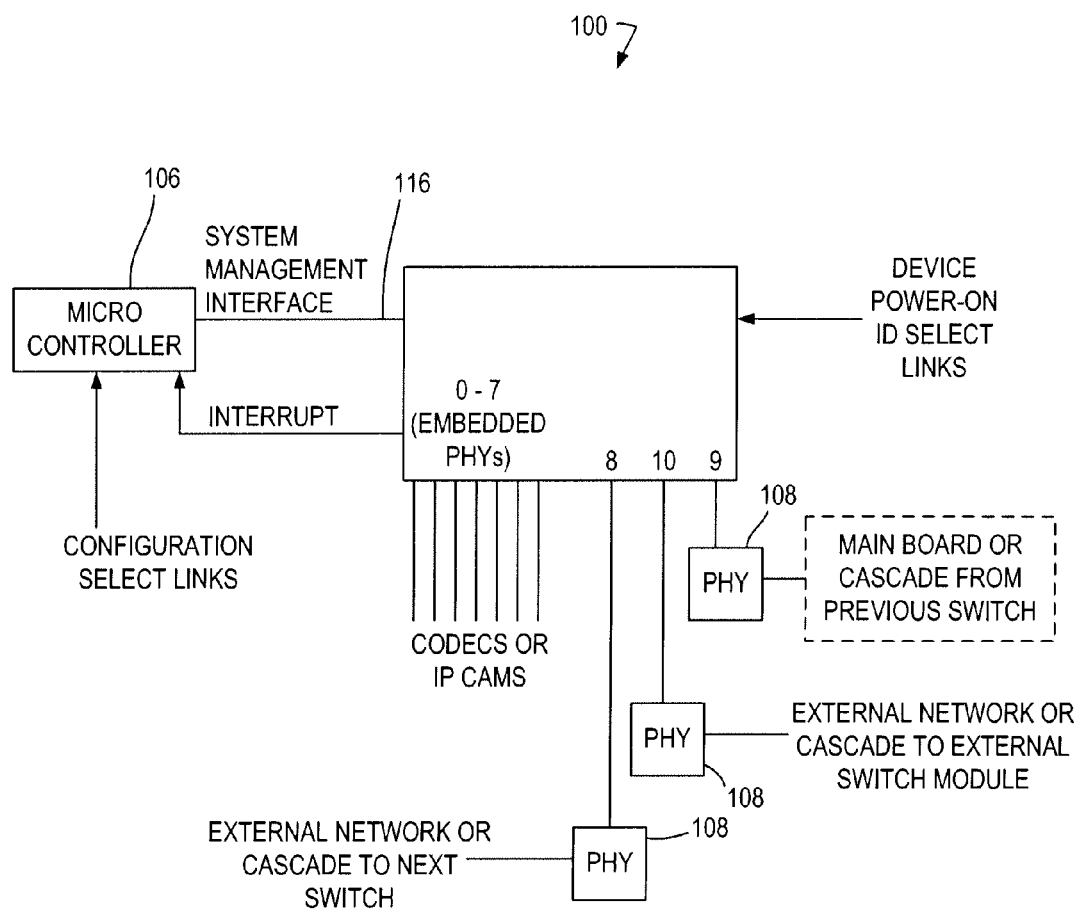
FIG. 2 schematically shows a switch included in a switching module, and its connections outside the switching module.

An exemplary system, shown in FIGS. 1 and 2 includes a switching module 100 comprising a pair of switches 102, 104 (e.g., Marvell 88E6097 switches) and subsidiary components including a setup microcontroller 106 and Gb Ethernet physical connectors/devices (PHYs) 108 as required. The switch 88E6097 is used for illustration only, and it should be understood that any switch in which received data frames can be tagged is within the scope of the present invention. This module provides 16 10/100 Mb Ethernet ports 110, and four Gb Ethernet ports 112. The 10/100 Mb ports 110 may have embedded PHYs, and the Gb ports 112 may require the use of external PHY devices. The two switch devices are interconnected by using direct serdes connection 114 of Gb ports without PHY devices.

Figure 3:
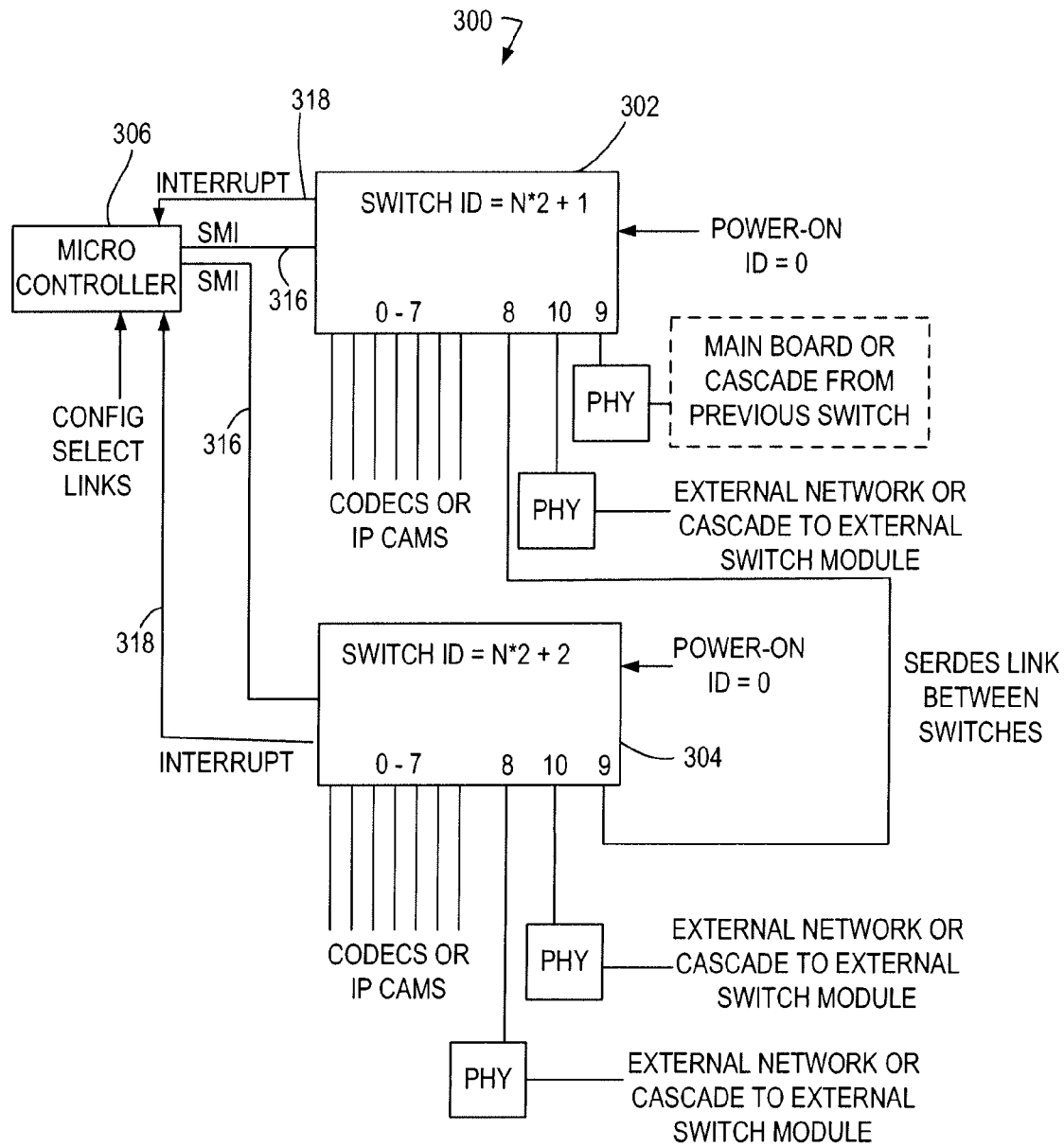
FIG. 3 schematically illustrates connections between two switches included in a switching module.

The switch may include many configurable features that can be programmed via internal registers. The power-up configuration for the switches may be loaded by a microcontroller chip 106 via a two-wire Serial Management Interface (SMI) bus 116, but settings can be queried and updated via the use of special Ethernet control frames that may be routed into port 9 of each device. This port can be connected to the main board Central Processing Unit (CPU) of the video server, directly for the first switch of the first module. As illustrated in FIG. 3, which shows a configuration 300 of two modules 302, 304, control frames may also be routed indirectly via intermediate switches for the second switch of the first module and for both switches of any cascaded modules.

As shown in FIG. 3, an individual SMI bus 316 may be used for each of the switch modules 302, 304, allowing for use of a faster register access protocol by the microcontroller 306. This may require that the switch ID value for both of the devices be set at zero by the power-on ID links. The microcontroller 306 can subsequently assign the operational switch IDs during the configuration process. The module ID number N can be set by configuration select links on General Purpose Input Output (GPIO) lines into the microcontroller; switch IDs may then be set using the values 2*N+1 and 2*N+2. The external Ethernet ports of the switch devices may not be enabled until the configuration process has been completed, so switch ID zero may not be seen on the network.

An interrupt line 318 can be connected to the microcontroller from each of the switch chips; it is possible for the interrupt to be triggered by control frames from the main board CPU. This can be used to request the microcontroller to read back register values from the switches, so that it can take note of configuration changes that may have been made remotely. Optionally, a Network Address Translation (NAT) router unit or a Stateful Packet Inspection firewall (SPI) unit may be included within the switch module.

A switch chip can route Ethernet frames between its port connections, as shown in FIG. 3. When a frame is received at an input port (ingressed) a number of rules (i.e., frame-routing rules) may be applied to determine where the frame may be output (egressed), according to the register settings of the switch. In order to apply the frame-routing rules, the switch module typically inserts extra data fields—known as a tag—within each Ethernet frame. Depending upon port ingress and egress rules, these tags may be automatically inserted and removed on ingress and egress of the frames, or may be applied to the frames while external to the chip in order to support inter-connection of multiple switch chips. Tagging can also be used after configuration of ports (i.e., after ports have been assigned unique numbers as described above) to limit certain MAC addresses to certain ports. This can provide MAC level access control list (ACL) operation by deterministic port assignment without requiring substantial operator specific knowledge.

A typical Ethernet frame format is as follows:

| | |
|---|---|
| 6 bytes | Destination address |
| 6 bytes | Source address |
| 2 bytes | Ether type |
| n bytes | Payload data |

When an Ethernet data frame is received by a switch chip, it may modify the frame format by the insertion of tag data as follows:

| | |
|---|---|
| 6 bytes | Destination address |
| 6 bytes | Source address |
| 2 bytes | Tag type flags/Source chip ID/Source port num |
| 2 bytes | Priority/VLAN ID |
| 2 bytes | Ether type |
| n bytes | Payload data |

Figure 4:
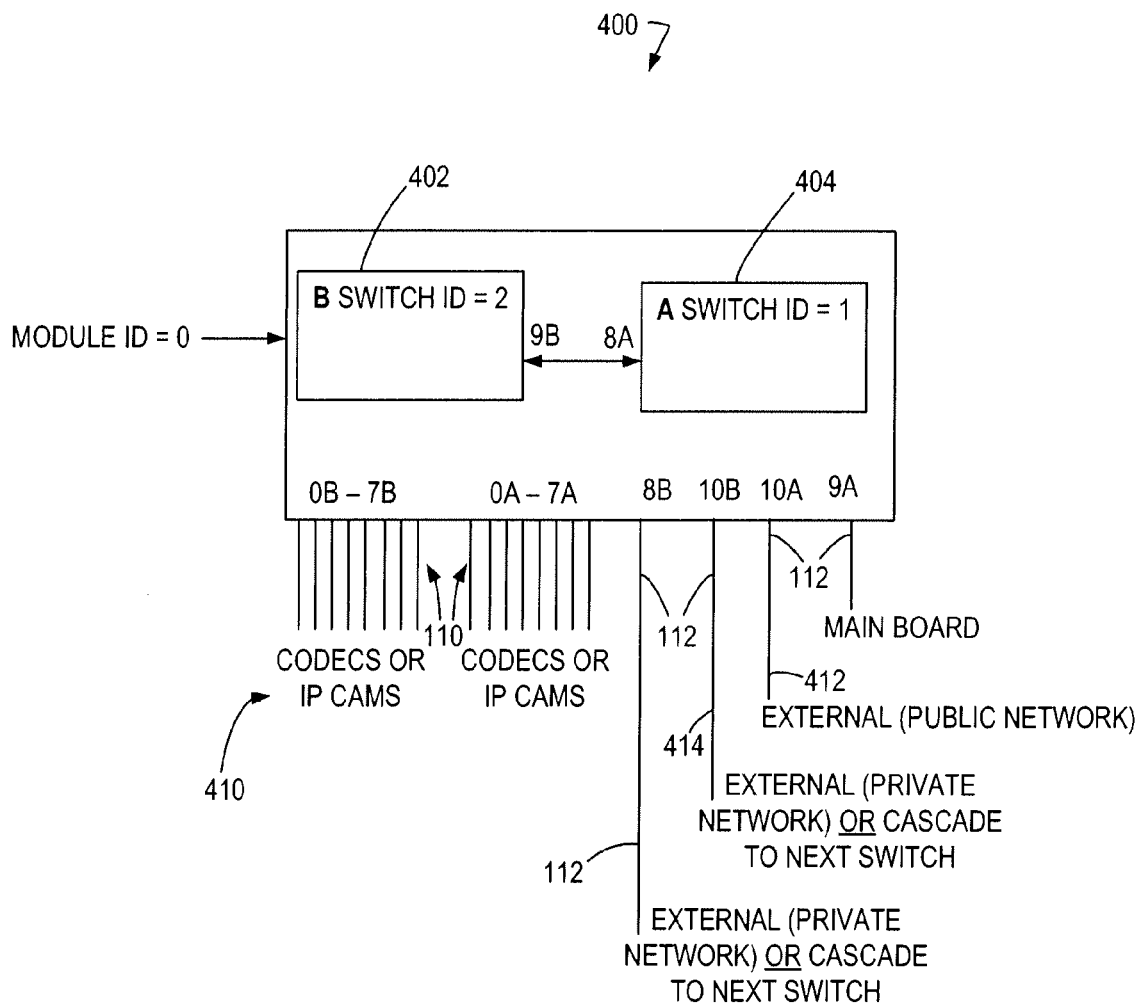
FIG. 4 schematically shows a switching module, and its external connections.

In a single module switch configuration, as shown in FIGS. 1 and 4, the source chip ID can be set by the configuration links of the chip, and the source port number can be the number of the physical port where the frame ingressed. The priority and Virtual Local Area Network ID (VLAN ID or VID) values may be set for each of the switch ports 110, 112. These values can be used to prioritize traffic from particular ports and to limit the routing of frames to keep traffic between certain ports private from traffic between other ports. The tag type flags can be used to denote special variations on the tag format, as described below.

Figure 5:
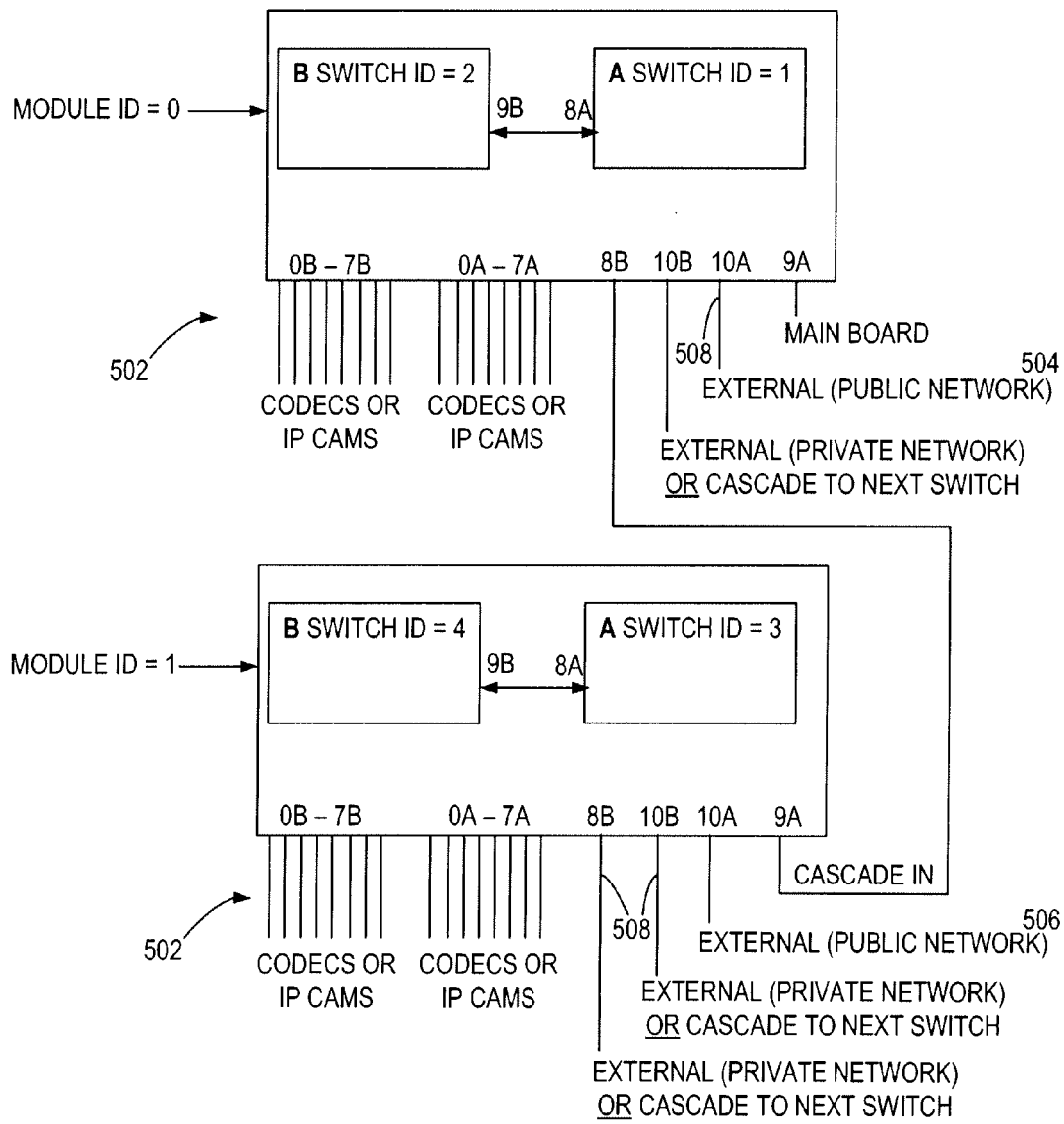
FIG. 5 schematically shows a configuration of two switch modules.

In multiple module switch configurations, as shown in FIGS. 3 and 5, the ports used for chip interconnections can be configured into a "distributed switch architecture" mode. In this mode, the tag data may not be removed from a frame upon egress, and may be assumed to be already present on frame ingress. The source chip ID and source port number fields may then identify the physical chip and port where a frame first ingressed the system from the external network, and the priority and VLAN ID values can provide for control of steering the frame throughout the extended switch network. In one embodiment, wherein a source chip ID may be a 5-bit field and values 0x00 and 0x1F are reserved for special purposes, a maximum of 30 chips may be inter-connected.

An extended tag format, shown below, can be used when a CPU may be connected directly to the switch

| | |
|---|---|
| 6 bytes | Destination address |
| 6 bytes | Source address |
| 2 bytes | User selected tag specifier value |
| 2 bytes | Reserved - always zero |
| 2 bytes | Tag type flags/Source chip ID/Source port num |
| 2 bytes | Priority/VLAN ID |
| 2 bytes | Ether type |
| n bytes | Payload data |

The tag-specifier value field can be used to indicate whether the frame contains a tag or is an ordinary Ethernet frame. In normal (i.e., untagged) frames there are generally only certain values used in the ether-type field (e.g., 0x800=IPv4 frame, 0x0806=Address Resolution Protocol (ARP) frame, 0x88A2=Advanced Technology Attachment (ATA) over Ethernet (AoE) frame). The switch can be programmed to recognize a special value as an indication that tag data is included and that the actual ether-type field follows after 8 bytes of other data. An example of a special value may be 0xAD01 which typically does not occur as the ether-type of any normal Ethernet frame.

When a switch port is configured to recognize a tag-specifier value, both tagged and normal Ethernet frames may be ingressed in any sequence. If bytes 13-14 have a special tag specifier value, then bytes 17-20 may be interpreted as the tag information; otherwise the frame may be considered as untagged and tag data may be automatically inserted according to the chip/port number and the default priority/VLAN ID settings for the port.

This configuration allows the CPU to originate frames that can be steered to specific egress ports by tagging different frames with different VID values. Ordinary frames (i.e., untagged frames) may be steered using the default rules of the ingress port. The default rules may be provided by the CPU. Moreover, the source chip/port ID fields within the frames egressing the switch to the CPU may allow the CPU to identify the physical port of origin for every frame. In particular, the data frames from the codecs or IP cameras connected via ports 0 through 7 of each switch chip can be associated with the physical connection without needing special knowledge of the Ethernet source address or IP address of each codec/IP camera.

The CPU can also use special settings of the tag-type flag bits as follows: (a) Setting 11b i.e., forward Distributed Switch Architecture (DSA) tag may imply a normal data frame from/to CPU, or from one switch chip to another; (b) 00b i.e., To-CPU DSA tag may imply control/management frame that may be received by the CPU; (c) 01b i.e., From-CPU DSA tag may imply control/management frame sent by the CPU; and (d) 10b i.e., To-Sniffer DSA tag may imply mirroring of frames to a nominated monitor port.

The to/from-CPU DSA tag formats can be used to send register read/write commands to the switch chips and to receive status information from the switch chips. In the from-CPU format, the source chip ID field can be used as a destination chip ID, allowing the CPU to send commands to any chip within the extended switch configuration. For reasons of security, the switch chips may only accept command frames when ingressed via a particular physical port, e.g., either through port 9 or port 10, selected at power up by the microcontroller programming. In some embodiments port 9 be a preferred port for interconnecting with the CPU, and may be configured as a control port of the switch module.

A typical default routing algorithm for all frames is as follows: (a) on ingress of each frame, the MAC source address (SA) may be stored with the physical port number in the Address Translation Unit (ATU) of the switch. This can be a hashed lookup table that can hold up to 8192 entries. It is assumed that all frames with a given SA will be received via the same physical port. The entries within the ATU will be aged out if not re-used within a certain time period (e.g., 5 minutes); (b) to decide the egress port for a unicast Ethernet frame, the ATU may be checked for an entry matching the MAC destination address (DA). If an entry is found, this can give the port number where frames received from this MAC address have previously been ingressed; this port may then be used for egress of the frame. If no entry is found, then it is unknown which port will lead to the required destination, and the frame may be egressed from all ports except the one where it originally ingressed; (c) broadcast ethernet frames may be egressed from all ports except the one where they originally ingressed; and (d) multicast Ethernet frames are egressed to one or more ports depending upon special entries within the ATU. Unlike unicast frames, however, where the ATU may automatically learn its entries from examination of the SA of the frames passing through, the entries for multicast addresses may have to be manually loaded from the microcontroller and/or CPU.

The default routing algorithm can be modified by register settings that configure virtual local area networks (VLANs) based on physical port numbers. Without a port-based VLAN setup, a frame ingressing any port may be egressed through any other port. When a port-based VLAN setup is used, for each ingress port there is typically an individual list of the allowed egress ports. The ingress/egress rules do not need to be symmetrical e.g., it may be possible to configure a VLAN which allows frames to flow from port 0 to port 1, but not from port 1 to port 0.

The port based VLAN routing may be operated in addition to the ATU routing. Thus, egress of broadcast frames can be limited to a selection of ports depending upon the ingress port, instead of to all ports. The egress of unicast/multicast frames may be determined by the entries in the ATU, but certain ports may be blocked (i.e., frames may not egress from a blocked port) according to the VLAN rules.

Port-based VLANs may be operated across multiple switch chips when directly inter-connected using the "distributed switch architecture" method. Here, the original source device and port number for each frame can be preserved within the tag information as the frame passes between chips, and the routing within each chip can be made with reference to the original chip/port ID values. For example, if a frame is ingressed to port 2 of chip 1, the port-based VLAN rules might limit its egress to only ports 7 and 8 of that chip. If port 8 connects to chip 2, then the frame might be limited to egress of only ports 5 and 6 of the second chip. But if a frame was originally ingressed to port 3 of chip 1, and similarly forwarded to chip 2 through port 8 of chip 1, that frame may be limited to egress only through port 7 of the second chip.

The port-based VLANs can provide for complex partitioning of a network into a number of virtual LANs with traffic being kept private within each VLAN group. These VLANs, however, do not allow for changing the group used for individual frames on a frame-by-frame basis. The default frame routing and port-based routing of frames can be further modified by the VLAN ID tagging of frames. When a normal Ethernet frame first ingresses to a multiple-chip switch system, it may be modified by the insertion of tag data as described above. This includes a VLAN ID (VID) value that may be set up individually for each port of each chip. In one embodiment, 4094 different VID values may be permitted. If a frame ingresses into the switch via a CPU-switch direct connection port, the CPU may pre-tag the frame, allowing the VID to be set on a frame-by-frame basis depending on the desired frame destination.

When the frame transits between switch chips connected in the "distributed switch architecture" mode, the tag data from the original ingress port can be preserved, hence the original VID value may remain unmodified in the frame until it finally egresses to a normal network port. Within each switch chip, there may be a list of port numbers that are associated with each possible VID value. A frame tagged with a particular VID may only egress through the ports listed for that VID.

The VID based VLAN rules can operate in addition to the port-based VLAN rules and the normal ATU routing of frames. For example, frames originated by the CPU and ingressing port 9 of chip 1 can be limited by port-based VLAN rules to egress only through ports 0 to 7 of chip 1, or ports 8 or 10 of chip 2. The VID rules can further specify that only VID=1 frames may egress through ports 0 to 7 of chip 1, only VID=2 frames may egress through port 8 of chip 2, and only VID=3 frames may egress through port 10 of chip 2. For non-broadcast frames the normal ATU rules may also apply so that the VID=1 frames egress can be filtered according to the particular MAC destination addresses, i.e., any particular frame having VID=1 may egress from only one of the ports 0 to 7 of chip 1 having a matching MAC address in the ATU. An IP camera may also be configured such that it can specify/change the VID of a frame being transmitted.

In one embodiment of a system according to the present invention, shown in FIG. 4, a module 400 for video recorder/server may include two switches 402, 404. The module can be configured to provide connections for 16 codecs or IP cameras 110. Connection to public Ethernet network 412, and two connections 414, 416 either to private video network or cascaded to expansion switch modules. At power on the default switch settings (that may be set by a microcontroller) assume that the port 8B and 10B connections will be to an external private video network. During the CPU startup and network configuration process, commands can be sent to the switches to detect whether in fact either of these ports are being used as cascades to connect to one or more additional switches, and accordingly, the switch settings may be revised.

In the module 400 shown in FIG. 4, five separate network regions can be created as follows: the external public network, the external private video network, the IP-camera/codec connections, the main board connection, and the internal inter-switch connection. Port-based VLAN rules and VID tagging of Ethernet frames can be used to enforce correct routing of traffic between these network regions. For example, frames from codecs/IP-cameras are normally originally untagged; these may be tagged with VID=1 on ingress to the switch module. Frames from the public network may treated as always untagged, and may be tagged with VID=2 on ingress to the switch module. Frames from the private video network may also be considered to be untagged, and may be tagged with VID=3 on ingress to the switch module. Frames from the main board may be either untagged or pre-tagged. Any untagged frames (e.g., from the boot loader) can be tagged with VID=4. Pre-tagged frames from an application program may be tagged with VID=5. Frames going through the inter-switch connection can retain the VID values they received when they first ingressed into the module.

Frames can then egress as follows: Frames having VID=1 (i.e., from codecs/IP-cameras) may egress to codecs/IP-cameras, private network, or main board CPU. Frames having VID=2 (i.e., from public network) may be allowed egress to public network or main board CPU. Frames having VID=3 (i.e., from private network) can egress to codecs/IP-cameras, private network, or main board CPU. Frames having VID=4 (i.e., from main board CPU) may be allowed egress to public network or main board CPU. These frames may include video data to be viewed by a computer on a public network. Frames having VID=5 (i.e., from main board CPU) may egress to codecs/IP-cameras or private network). These frames may include control information (e.g., pan, zoom, etc.). Note that uni-cast frames can be steered to the correct destination port by the learned addresses within each switch's address database (as described above). The VID/port VLAN routing rules can further limit the possible routes for unknown addresses and for broadcast/multicast traffic.

Typical power on settings are shown in the table below. It should be understood that the settings described in the table are illustrative only, and that other settings of ports are within the scope of the present invention.

---

Ports 0A to 7A (for connection to codecs or IP cameras)

Ingress mode normal network, internally tag frames with VID = 1, SID = 1, PID = port number.
Egress mode normal network, remove internal tag from frames.
Port-based VLAN routing rules, ingressing frames allowed egress ports 0A-7A (to go to other codecs/IP-cameras), 8A (to go to other switch chip) and 9A (to go to main board CPU). Port 10A egress is blocked (frames cannot go to public network).
Port 8A (cascade to switch B)

Ingress mode DSA tagged; all frames contain tag information passed from switch B.
Egress mode DSA tagged; all frames contain tag information passed to switch B.
Ingressed frames allowed egress at ports according to the VID based VLAN routing rules detailed above.
Port 9A (for connection to mainboard CPU)

Ingress mode ether-type DSA tagged; frames containing extended tag information keep their existing VID/SID/PID values, frames not already containing tag information are internally tagged with VID = 4, SID = 1, PID = 9. This allows the CPU to inject pre-tagged control frames for read/write of switch registers, and pre-tagged normal data frames with other VID values.
Egress mode ether-type DSA tagged for all frames, extended tag created using information from the internal tag. This allows the CPU to see the VID/SID/PID of all received frames.
Ingressed frames allowed egress at ports according to the VID based VLAN routing rules detailed above.
Port 10A (for connection to external public network)

Ingress mode normal network, internally tag frames with VID = 3, SID = 1, PID = 10.
Egress mode normal network, remove internal tag from frames.
Port based VLAN routing rules, ingressing frames allowed egress port 8A (to go to other switch chip) and port 9A (to go to main board CPU). Ports 0A-7A egress is blocked (frames cannot go to codecs/IP-cameras).
Ports 0B to 7B (for connection to codecs or IP cameras)

Ingress mode normal network, internally tag frames with VID = 1, SID = 2, PID = port number.
Egress mode normal network, remove internal tag from frames.
Port-based VLAN routing rules, ingressing frames allowed egress ports 0B-7B (to go to other codecs/IP-cameras), 9B (to go to other switch chip), 8B and 10B (to go to private video network).
Ports 8B and 10B (for connection to external private video network, but allowing detect of cascade to further switch modules)

Ingress mode ether-type DSA tagged; frames containing extended tag information keep their existing VID/SID/PID values, frames not already containing tag information are internally tagged with VID = 3, SID = 2, PID = port number.
Egress mode ether-type DSA tagged for control frames, extended tag created using information from the internal tag. Egress mode normal network for all other frames, internal tag information is discarded.
Ingressed frames allowed egress at ports according to the VID based VLAN routing rules detailed above.
Port 9B (cascade from switch A)

Ingress mode DSA tagged; all frames contain tag information passed from switch A.
Egress mode DSA tagged; all frames contain tag information passed to switch A.
Ingressed frames allowed egress at ports according to the VID based VLAN routing rules detailed above.

Ethernet driver code in a boot operating system (e.g., boot loader) can be modified to remove (and discard) any extended tag information from incoming frames, as indicated by an 0xAD01 value in the position of the ether-type field. With any other value at this position, the frame may be passed through to the TCP/IP stack unchanged. This switch configuration can allow free data transfer between main board and the public network connection, without the boot operating system requiring any knowledge of the switch module presence. No dynamic configuration of the switch is required to allow normal boot operation, i.e., DHCP/ARP/TCP etc. can operate with no code modification other than the single change in the low level Ethernet driver as described above. Note that Redboot with this modification can also operate correctly on a main board that has a direct connection to the public network, i.e., when the switch module is not present.

According to the configuration described above, frames cannot pass from port 10A to ports 0A-7A and vice-versa—this is forbidden by the port-based VLAN routing rules. Frames can pass from port 10A to switch B via the inter-switch link, but the VID based VLAN routing rules can then prevent egress to ports 0B-7B or the private network ports. Note, this may also be achieved in port-based routing wherein the source port ID would be retained in a frame, and then the ingress port of switch B would apply rules of port 10A. Hence a total firewall is automatically enforced between the public network and the private video network, even when operating under control of the boot operating system and when no specific switch module supervisor software is active. As a result, a method of frame header spoofing by an attacker on the public network may not provide access to the devices on the private video network.

Traffic can be freely allowed, however, between any of ports 0A-7A and 0B-7B (via the port 8A to 9B inter-switch link), and also between any of these and the private network connections ports 8B and 10B. When IP-cameras (as opposed to codec cards) are connected to any of ports 0A-7A, 0B-7B this configuration allows them to operate normally even before the main board application has booted up. For example, the IP-cameras may be browsed from a decoder unit connected on the private video network even if the main video server were inactive.

When an endpoint/device (e.g., an IP camera or an analog video camera having a codec) is connected to a port, a unique identifier associated with the device, such as a MAC address of the device is recorded in the port. Once a device identifier for each port is recorded, the system is "locked down," i.e., a recorded identifier can be subsequently changed only by an authorized application program. At the point of lock down, the devices/endpoints become secured or trusted endpoints. During normal operation, the port receives and routes data frames from a connected device only if the unique identifier associated with the device matches with the identifier stored in the port. In case of a mismatch of identifiers, the port and/or switch detect that a different, unauthorized device is connected to the port, and the port ignores the received data frames. Thus the closed network also becomes secured because the ingress port ensures that the data frames routed through the network were received from a secured or trusted endpoint.

In some embodiments, instead of forming a total firewall between the public network and the private video network, it may be necessary to provide limited access to some devices/endpoints. In that situation, it is critical that any tampering with the device connected to a port be detected, so as to ensure that only authorized data are received by private network. Even when the access granted to an endpoint/device is limited, there is a risk of spoofing the unique identifier (e.g., MAC address, IP address, etc.) associated with the device. If the device's unique identifier is spoofed, it would match with the recorded identifier in the switch/port. Thus, the switch/port would not detect the unauthorized device.

In order to substantially eliminate or mitigate the risk of identifier spoofing, pro-active monitoring schemes are implemented to ensure that only the secured devices are connected to the switch. In one embodiment, at the point of lockdown, a unique key is generated corresponding to the trusted endpoint by the switch and is stored in the switch and at the trusted endpoint. Additionally or in the alternative, the key is stored at an IP master (e.g., a main computer or another trusted endpoint to which even a limited access is not granted). The unique key is generated by encrypting the device's MAC address using MD5 hashing, and it may be generated randomly. Other encryption methods and/or device parameters other than its unique identifier may also be used for generating the unique key. The unique key is configured such that it is substantially inaccessible from a public network, even though, the public network may have limited access to the secured endpoint for which the key is generated.

At the point of lock down, a manifesto of all known, allowed, and connected IP address is compiled. Using the manifesto, the secured endpoints are polled at regular and/or random intervals requesting their respective unique keys. Even if an unauthentic device connected to a port spoofs the unique identifier, it may not have the correct unique key supplied by the switch at the point of lockdown. Therefore, if the key transmitted by an endpoint does not match with that stored in the switch and/or at the IP master, the endpoint can be determined to be unauthentic.

In some embodiments, the device may include the unique key in the header of the data frames transmitted. In order to limit the network traffic load, the unique key may be included in only some and not all data frames. Similarly as above, if the unique key in the header does not match with that stored in the switch, or if a key is not received when expected, the device sending the data frame can be identified as unauthorized. In other embodiments, the key may be used to encrypt the data frames transmitted by a trusted endpoint/device. If an unauthorized device sends data frames to a port, those data frames would not be encrypted using the unique key provided to the authorized device and, hence, the switch and/or port would recognize that the received data frames were not transmitted by an authorized source.

In one embodiment, pro-active monitoring is achieved by configuring a secured endpoint to monitor network traffic to detect if another device is spoofing, i.e., transmitting the endpoint's unique identifier to the switch. In that event, the trusted endpoint may send an alert signal to the switch.

A secured endpoint can also store counts of data frames ingressed and egressed by the endpoint. At regular and/or random intervals, the switch may poll the endpoints for the stored counts and compare the received values with the respective counts maintained by the switch. If an unauthorized device were successful in transmitting data frames to the switch, the count values at the switch would not match with those received from the trusted endpoint, thus informing the switch the presence of the unauthorized device at the port where the count values did not match.

According to the various embodiments described above, the presence of an unauthorized device at a certain port may be detected by the switch. The switch may not be able to locate the rogue device, however, preventing it from sending data. In order to prevent further interference from the unauthentic device, the switch may isolate the port at which the rogue device was detected from the public and/or private network. The switch may also isolate the port entirely for a certain duration, re-check the status of the port and its response to polling after a predetermined interval, and re-establish its connection. The port and/or switch may also generate a system event (e.g., e-mail, alarm, etc.) when an unauthorized port is detected, alerting a system administrator to take further actions that may be necessary to secure the network.

Ethernet driver code in the application can be modified to remove any extended tag information from incoming frames. A cache of Switch ID (SID)/Port ID (PID) values corresponding Ethernet source address may be maintained, however. VID values can be used to route frames through a number of virtual Ethernet interface channels to the TCP/IP stack. The upper layers of the TCP/IP stack can receive normal network frames, although appearing to have come through multiple interfaces according to VID value.

Outgoing frames from the TCP/IP stack can be transmitted as normal network frames if sourced from virtual Ethernet channel number zero. For other virtual channels the frames may be transmitted with extended tag information inserted containing the appropriate VID value. Switch control frames can be generated by direct calls to the Ethernet driver from a switch driver application, and these frames typically bypass the TCP/IP stack.

The existing application network code can operate without modification with respect to traffic between the main board and the public network. The application does not need any switch-awareness for normal operation of DHCP/ARP/TCP etc. The application program build can also operate normally on a main board that has a direct connection to the public network i.e., when the switch module is not present.

Switch-aware application code can check for the presence of the switch module by checking the Ethernet driver cache of SID/PID/SA values to see if incoming frames are being received with tags. If there are no incoming frames (interface connection seeming to be operational, but not receiving traffic) then control frames can be sent to determine if there is any response from the switch. These frames may not affect a public network if they are transmitted to such network when a switch is not present. The 0xAD01 marker (i.e., tag-specifier value) in the frames may only have meaning for specially configured switches. All other equipment (even if containing a switch chip) may ignore the control frames.

When the presence of a first Ethernet switch module has been established, control frames can be sent out to detect the presence of second and subsequent modules that may be connected via the ports 8B and 10B cascade connections. If additional switches are detected, the routing rules can be revised and the egress mode of these ports can be reconfigured to use Ether-type DSA tagging for all frames. Then, the VID/SID/PID values originating from the CPU can be preserved on frames that are addressed to destination ports reached via the second/subsequent switch modules.

Normal network traffic to be sent from the CPU to the codecs/IP-cameras, or to any devices attached via the private video network (e.g., AoE drives that must not be accessible on the public network), can be automatically tagged with the required VID value to allow routing to the necessary ports of the switch module, by being transmitted via the appropriate virtual Ethernet interface channel. In the TCP/IP stack this is looked after by the IP address routing tables in exactly the same way as when using multiple physical ethernet interfaces. In the AoE driver, this just requires adding interface "eth2" as an extra interface where AoE drives may be searched for. Switch-aware application code can find the codecs/IP-cameras that are physically attached to switch ports 0A-7A and 0B-7B, by querying the Ethernet driver cache for SID/PID/SA values. The SA can then easily be converted to the codec/camera IP address by either searching the ARP cache or using the RARP protocol.

Optionally the switch-aware application code may seek to mirror some ARP frames received from the public network segment onto the private network segment, and vice versa. Commonly, IP allocation for devices on the private network uses the zero-conf protocol and allocation on the public network typically uses a DHCP server, so that there may be no address conflicts. In some circumstances, however the zero-conf protocol may also be used on the public network, creating the possibility of address conflicts.

If zeroconf address range ARP frames are mirrored between public to private networks, and vice versa, conflicts can be avoided because both segments can have visibility of addresses that have already been used. ARP frames are the only type of frames that may be allowed to pass between the public and private network segments. Note that this mirroring may not be done automatically within the switch module, but by reception at and re-transmission from the main board CPU. This can facilitate preventing an ARP frame circling between two video servers via public and private network segments (i.e., being transmitted repeatedly, back and forth, between the two servers). If an incoming ARP were recognized as being identical to one previously transmitted within a short interval, it may not be re-transmitted.

Codec and IP camera software can operate without modification, other than generally using the zeroconf method for assigning IP addresses instead of DHCP. As far as these modules are concerned they may be connected via an ordinary Ethernet network. The codec/IP camera software can operate normally as long as the switch module is powered up, even when the main board is inactive or running boot operating system. In this mode, however, the network may operate as private network that is hidden from the public network, i.e., there may be no transfer of any data between the two network segments.

An alternative setting for the egress mode of switch ports 0A-7B can provide for a high security mode of operation of the codecs/IP-cameras. These ports may be set to use egress mode ether-type DSA tagged for all frames, with extended tag created using information from the internal tag. This may require that the Ethernet driver code of the codec/IP-camera be tag-aware, so that it can check for and remove the extended tags before passing frames up to the TCP/IP stack, caching the SID/PID/SA information in the driver. The cached information can allow the device to gain knowledge of the physical connection (i.e., port) sourcing received commands, in particular to provide a higher level of access from the main board CPU (SID=1, PID=9) than from any other connection. For example, an IP-camera connected to one of ports 0A-7B, might allow configuration commands only from the main board of a video server directly connected to the switch, while allowing other video servers or decoder units connected to the private video network to make connections for the purpose of viewing images only. The high security mode may be used only with codecs/IP-cameras that have been identified as supporting this operation.

A two-module system is now described with reference to FIG. 5. This system can provide connections for 32 codecs or IP cameras 502, two connections 504, 506 for public Ethernet networks, and three connections 508 for private video network or for cascade to expansion switch modules. The power-on settings for the first module can be similar to those for a single module having two switches, as described above. The settings for the second module are similar, but with an important difference that the default VID value for port 9A may be 5 (i.e., private network traffic) instead of 4 (i.e., public network traffic). This setup can be automatically managed by the module microcontroller, based on the module ID.

Main-board software may also be operated as described above for a single module. The power on settings of the switch modules may allow boot operating system to communicate with devices on the public network segment via the first public network connection on switch module zero. All devices on the private network segment can inter-communicate without Redboot requiring any special awareness of the switch modules or having to perform any special setup actions. Redboot may not communicate with the private video network, and there may be no traffic between the public and private network segments.

When the main application code starts up, it can check for the presence of the first switch module by detecting whether incoming frames are being received with tags and by sending control commands to the switch. Once the first module has been detected, control commands can be passed through to detect the second module. The ingress/egress modes of the inter-communicating ports of the switches can then be modified to provide full distributed switch architecture operating mode with the tag information being preserved on all frames passing either way through the link. This process can then repeated as necessary to detect any further cascaded switches.

The distributed switch architecture design may allow up to 30 switch modules to be linked for a single video server, providing up to 240 ports for connecting IP-cameras/codecs. All switches may be set with a different SID value to allow correct physical port to tag information correspondence. Switch modules may be cascaded together in a chained manner without requiring any other external dumb switch/hub units. Each module can have two connections available that may be used as private network connections or as cascades to further switch modules. A few example configurations are shown in FIGS. 6-8.

Figure 6:
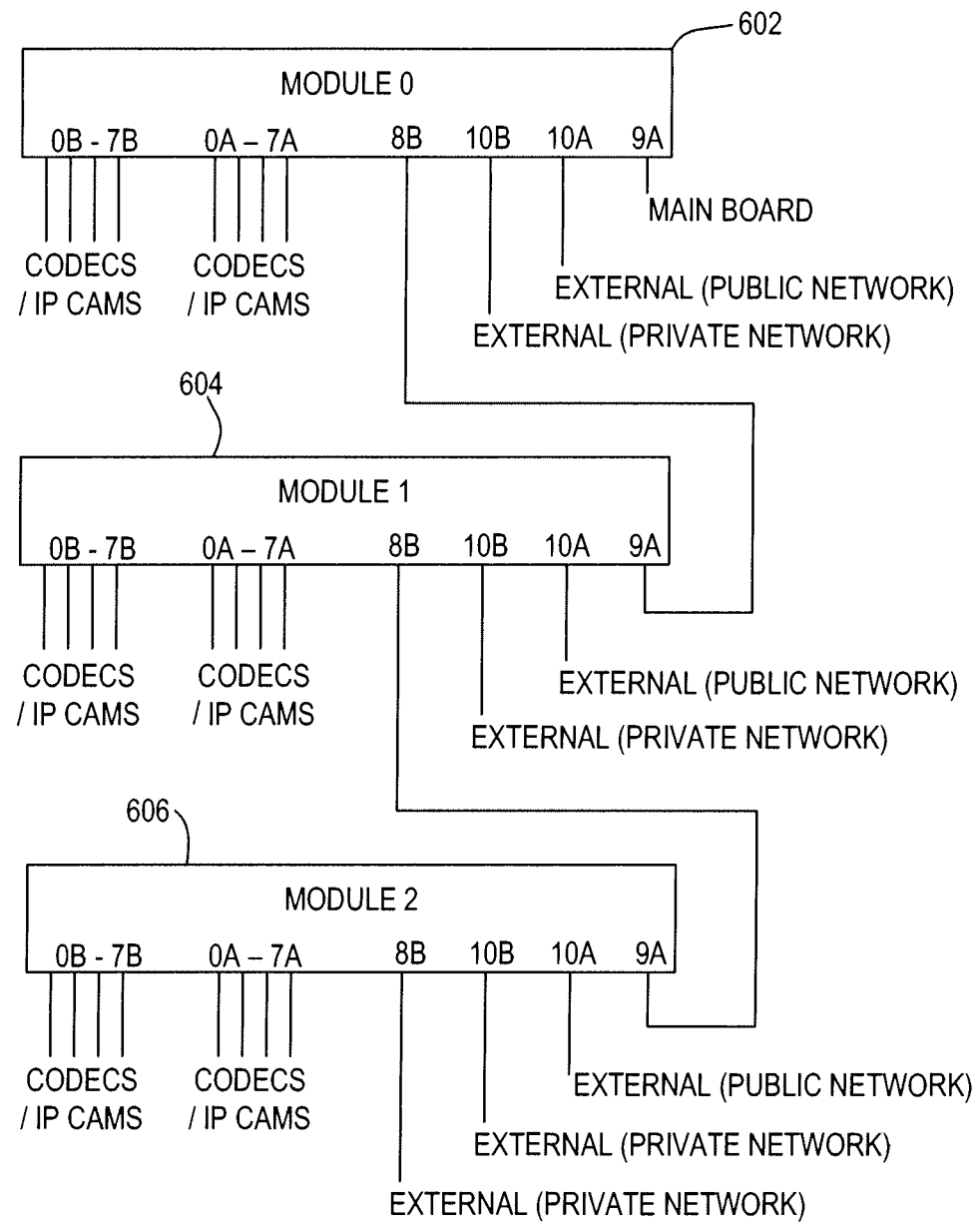
FIG. 6 schematically shows a configuration of three switch modules connected in a chain.

The embodiment illustrated in FIG. 6 includes three modules 602, 604, 606 arranged in a linear chain. It has 3 public network connections, 4 private network connections, and up to 48 codec/IP-cameras. Data from the first 8 cameras can be received by the main board via a single switch, data from the second 8 cameras via two switches, and data from the third 8 cameras via three switches.

Using a purely linear chain the maximum number of switches that frames have to pass through increases directly with camera count. Note that module numbering can be in increasing order according to the cameras or in any other order. The internal module of the video server may be module zero as the default power-on configuration of module 0 is typically different. The module IDs of other modules can, however, be set to any values in any order provided that all modules are given unique numbers.

Figure 7:
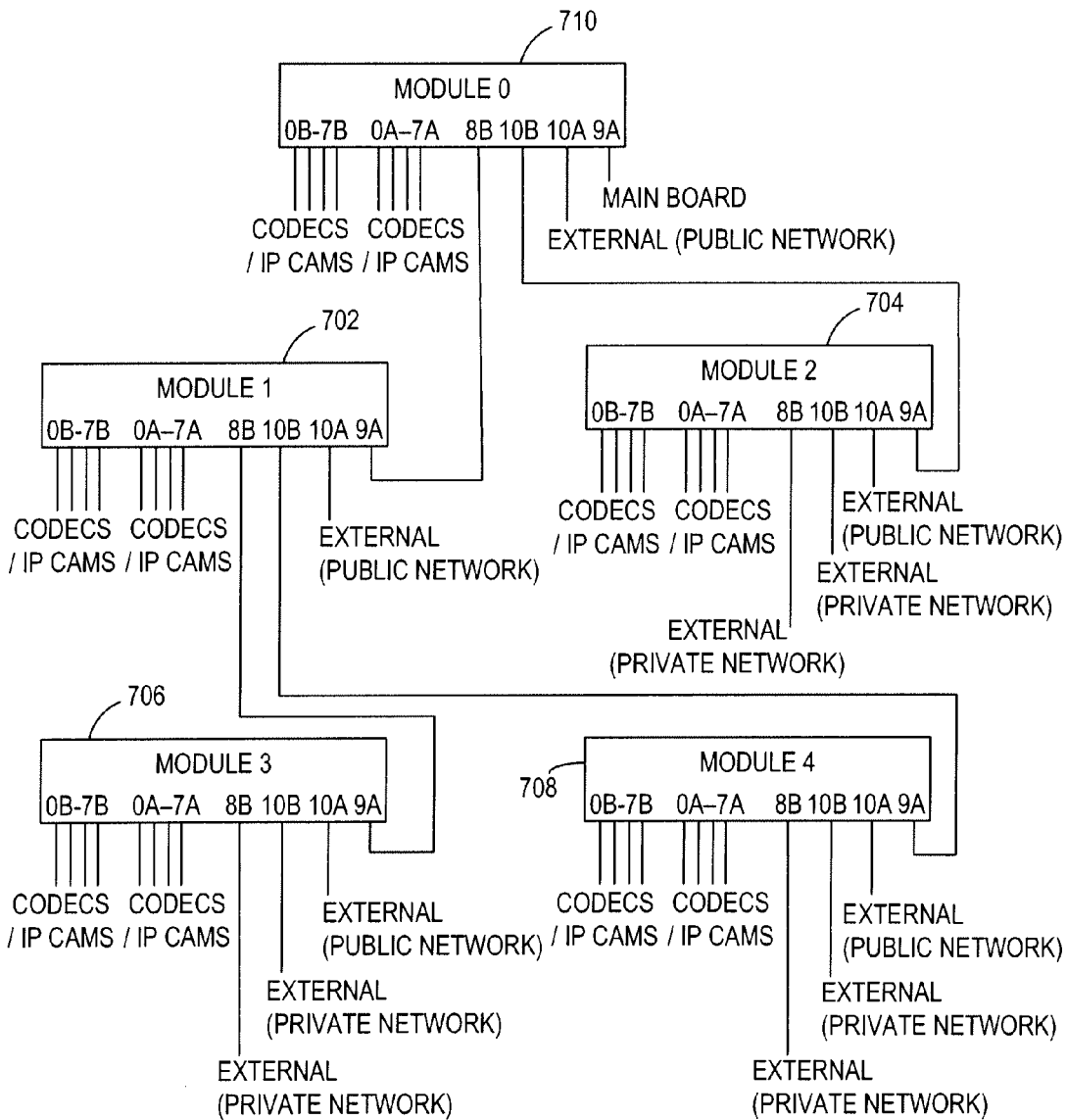
FIG. 7 schematically shows a configuration of five switching modules connected in a branching pattern.
Figure 8:
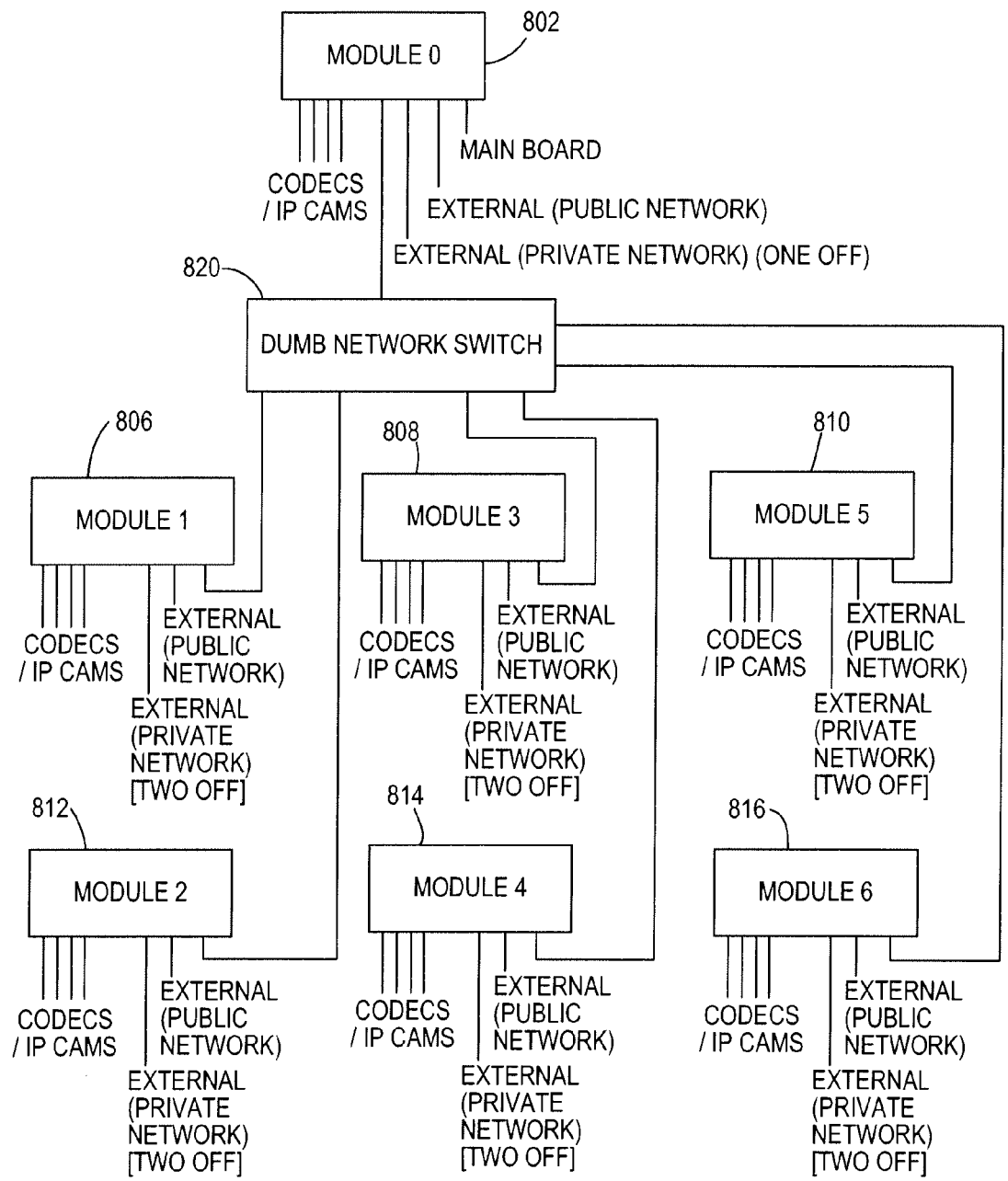
FIG. 8 schematically shows star-connected switching modules, using a dumb network switch.

Another embodiment, shown in FIG. 7 has five modules 702, 704, 706, 708, 710, forming a branching chain. It can provide 5 public network connections, 6 private network connections, and up to 80 codecs/IP-cameras. In this configuration, data transmitted to the main board from any camera may not have to pass through more than 6 switches (i.e. three modules). Using a branching chain the maximum number of switches that frames may have to pass through increases logarithmically with camera count.

Use of additional dumb switch/hub units (e.g., off-the-shelf network switches) may be connected in a star-interconnect configuration, as shown in FIG. 8. The embodiment shown in FIG. 8 uses seven intelligent video switch modules 802, 804, 806, 810, 812, 816, 816 and a dumb network Gb Ethernet switch 820 having at least seven ports. This system can provide up to 112 IP-cameras/codecs, seven public network connections, and thirteen private video network connections. In this system, Ethernet frames may not have to pass through more than five switches (four in modules and the dumb network switch). The spare ports of the dumb switch may not be used as extra private or public network ports, however. The dumb switch is considered to be part of the cascade connection and all traffic passing through it may contain VID/SID/PID tag information using the 0xAD01 tag marker.

Figure 9:
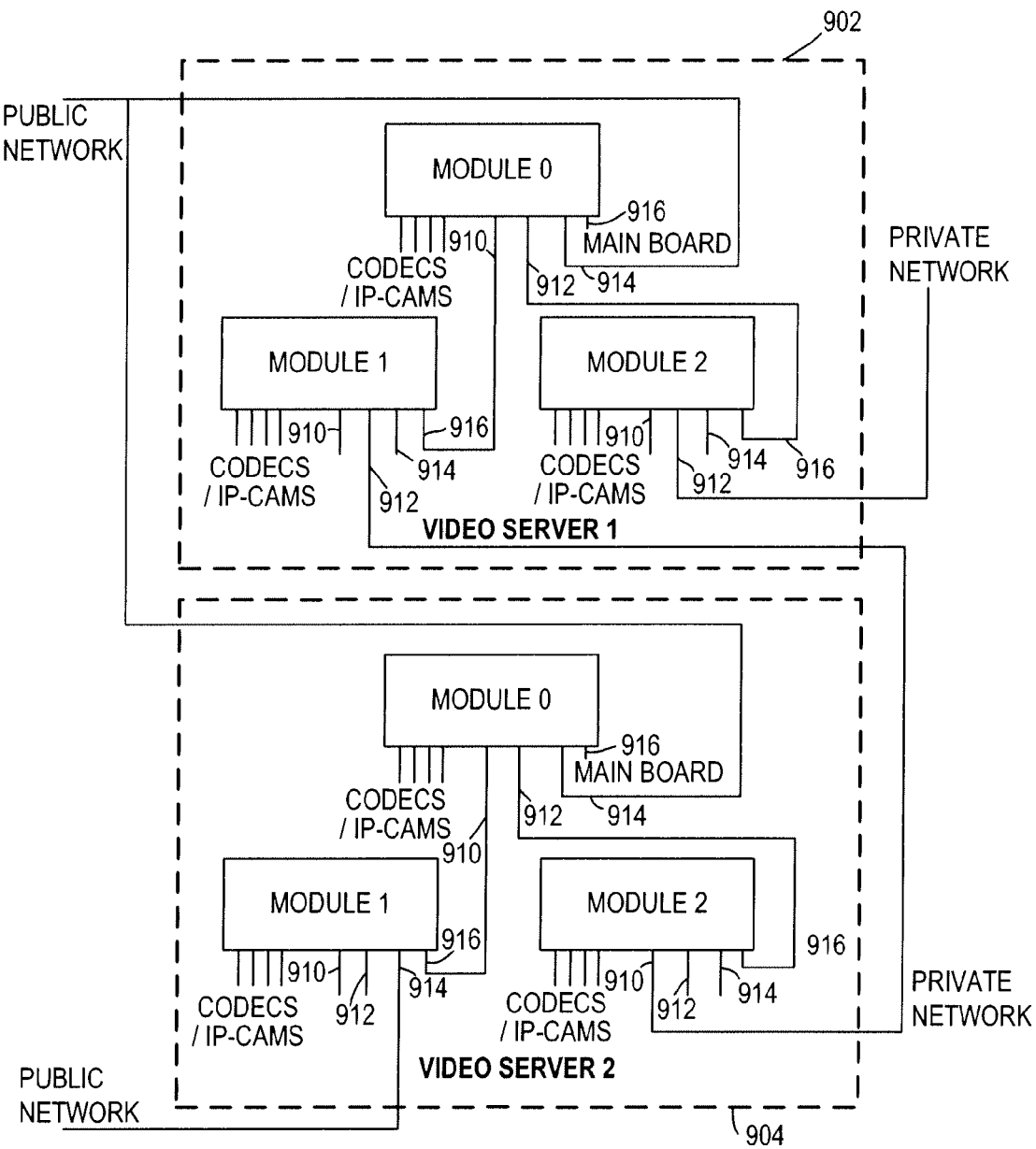
FIG. 9 schematically illustrates a configuration of two video servers.

FIG. 9 illustrates one possible interconnection between two video servers 902, 904 each of which uses multiple switch modules. As shown in FIG. 9, multiple video server systems may be interconnected using their public and/or private network connections. Their cascade connections must be isolated. A single video server may be considered to include a main system unit with its built-in switch module, plus optional additional switch modules linked in a cascade network. The module ID numbers must all be unique within the network of one server, but do not need to be unique across different servers (indeed, each server may have at least an individual module zero).

On each of the switch modules, the four connections shown are (left to right) private/cascade-out 910, private/cascade-out 912, public network 914, main-board/cascade-in 916. The two servers are connected together on both public network and private network. Note, however, that there is only a single interconnect on each side for preventing network loops. The private network link between the servers differs from an internal cascade connection in that the outgoing port from server one is operated in private network mode, not cascade-out mode; and the ingoing port of server two is another private network port, and not a cascade-in port.

The IP-cameras/codecs connected within each video server may be considered to be owned by the particular server. Only server 1 may have visibility of the VID/SID/PID tags on the traffic from the server 1 IP-cameras (and hence immediate knowledge of the physical connectivity of these IP-cameras); likewise only server 2 may have visibility of the traffic tags for its IP-cameras. However, all these IP-cameras/codecs may also visible as normal network devices on the private video network. Therefore, it may be possible for server 2 to make a guest connection to view any of server 1's cameras, without the data having to all be routed via the server 1 main board CPU. An exemplary data flow can be [server 1 IP-camera]→private network→[server 2 display codec].

Guest connections can also be made via the public network, but in this case the firewall operation means that all data has to be routed via the main board CPUs. For example, the server 1 can request camera data from server 2 via the public network, but the connection may have to be established between the two CPUs and the data may flow as [server 2 IP-camera]→[server 2 main board]→public network→[server 1 main board]→[server 1 display codec]. In general, it may thus be preferable for connections between locally related video servers to use the private video network, with the public network only used when accessing to remote or unrelated servers.

Figure 10:
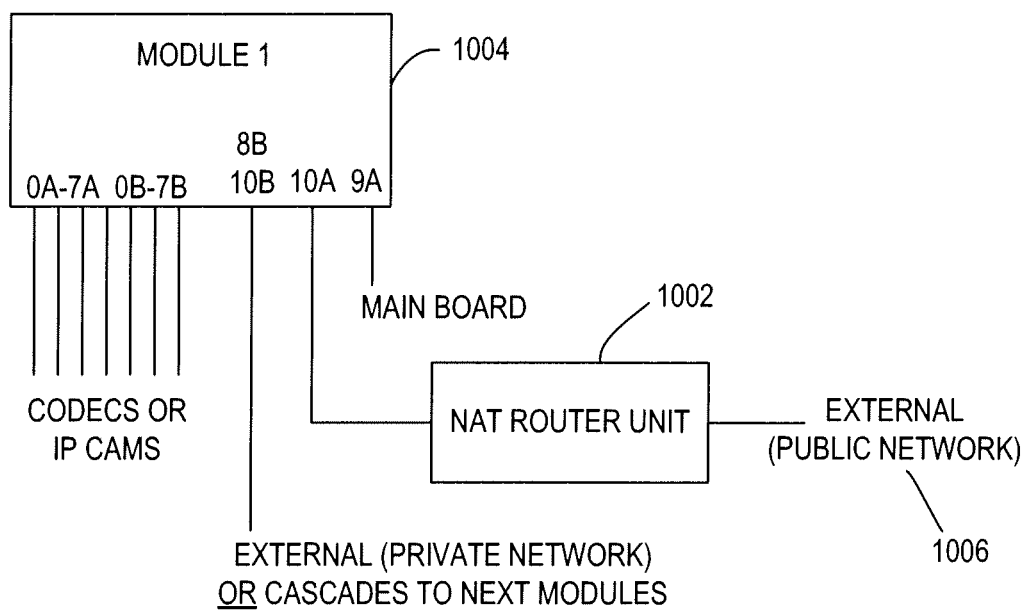
FIG. 10 schematically shows a configuration of a switching module and a Network Address Translation (NAT) router.

For advanced firewall applications, a NAT router unit can be included within the switch unit, as shown in FIG. 10. This can provide for intelligently tunneling selected traffic between the public, private, and internal network segments. The NAT router 1002 may include a fast network processor device capable of receiving frames, inspecting the frame data at L2 (Ethernet header)/L3 (IP header)/L4 (TCP header) protocol layers, applying rules for accepting/rejecting/modifying frames, and then re-transmitting them. The NAT router 1002 may be sited between port 10A of a first switch module 1004 and the public network connection 1006. Instead of or in addition to a NAT router, a SPI unit can also be used.

All frames moving between the public network and the switch module may have to pass through the NAT router 1002. It can inspect and optionally modify the MAC address, IP address, and TCP port number information. The standard routing rules for frames ingressing the switch module at port 10A from the public network only allow egress to the main board CPU on port 9A. When the presence of the NAT router 1002 has been detected, however, these rules may be updated to allow for the ingressing frames to be VLAN tagged. The frames can then be directed either to the main board CPU, the codecs/IP-cameras, or the external private video network according to the VID values. Similarly, frames originating from the codecs/IP-cameras and private video network can normally only egress port 9A, but special VID values may allow them to egress at port 10A for transit to the public network via the NAT router 1002. Detection and dynamic configuration of the NAT router may be performed by the main board CPU sending special control frames. This can also allow updating of the NAT routing rules on the fly.

Figure 11:
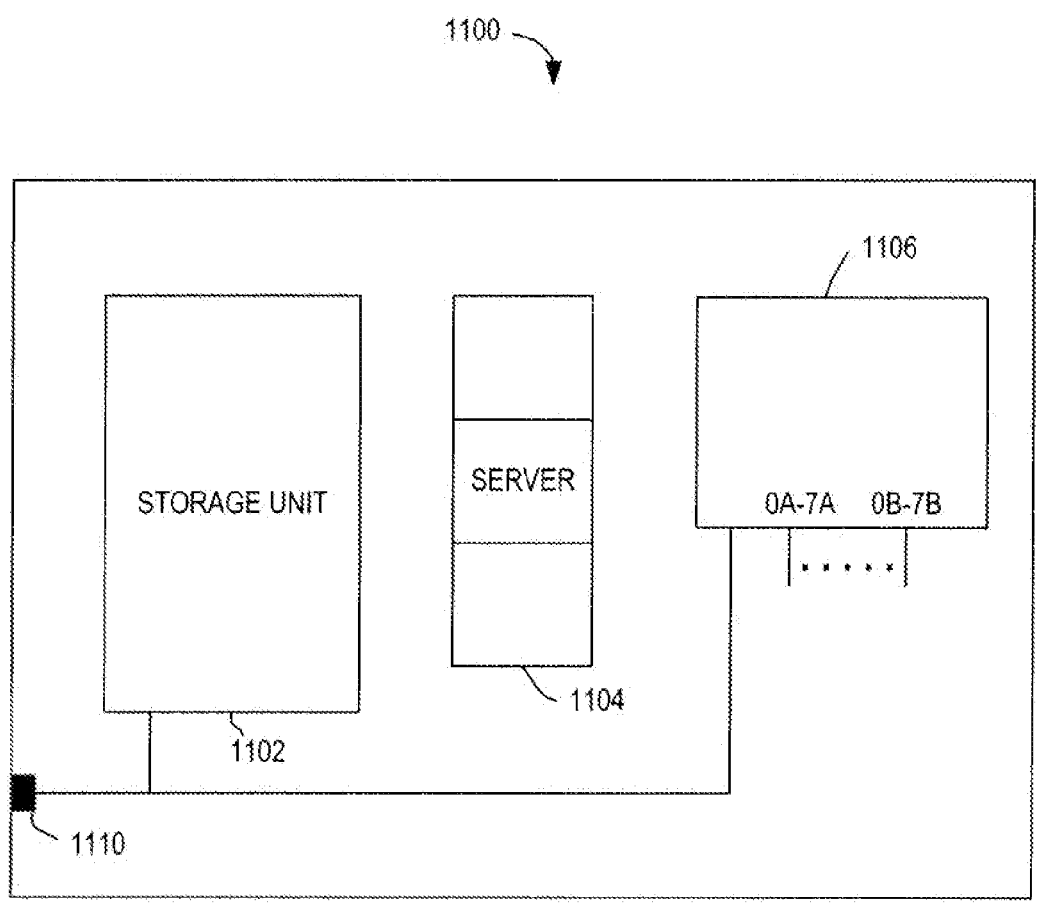
FIG. 11 schematically shows an IP camera according to the present invention.

FIG. 11 schematically shows an IP camera 1100 according to the present invention. The IP camera 1100 includes a storage unit 1102, a server 1104, and a switching module 1106. A terminal 1110 of camera 1100 is connected to port 0A of the switching module 1106, and also to the storage unit 1102. Video data recorded by camera 1100 may be delivered on terminal 1110, and may be stored in storage unit 1102, and may also be routed through switching module 1106 to other destinations in a secure network. Other cameras (IP or analog) can be connected to ports 1A-7A, and ports 0B-7B of switching module 1106.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A switching module comprising:
    a first port group comprising at least one source port, wherein each source port in the first port group is configured for: (i) testing if a data frame received at that source port includes a tag and, only if a tag is not included, modifying a data frame transmitted by a data source in communication with that source port by including in the data frame a tag comprising a unique port ID that is based on a source chip ID and a source port number, and (ii) routing the modified data frame to a destination port in a second port group, the destination port being adapted to communicate with a receiver, if a unique port number assigned to the destination port is associated with the tag in a routing table assigned to the source port; and
    a control unit for assigning a unique port ID comprising a source chip ID and a port number combination to each port in the first and second port groups, and for assigning to each port in the first port group a routing table including at least one tag and at least one destination port number associated with the at least one tag.

2. The switching module of claim 1, wherein the data source comprises an IP camera.

3. The switching module of claim 1, wherein the data source comprises an analog camera and a codec.

4. The switching module of claim 1, wherein the data source comprises an encoder, wherein a device connected to the encoder can be selected from a group consisting of an IP camera, an analog camera, and an SDI camera.

5. The switching module of claim 1, wherein the data source can be selected from a group consisting of an access-control reader and an alarm.

6. The switching module of claim 1, wherein the receiver comprises means for viewing the data frames received through the connected port.

7. The switching module of claim 1, wherein the receiver comprises means for storing the data frames received through the connected port.

8. The switching module of claim 1, further comprising a third port group comprising at least one port, wherein each port in the third port group is configured for connecting with a private network of computing devices, and the control unit is configured for:
    assigning a unique port ID comprising a source chip ID and a port number combination to each port in the third port group; and
    enabling communication of data frames, based on at least in part VIDs therein, between ports in the third group, a port in the third port group and a port in the first or second port groups, and between a port in the third group and the control unit.

9. The switching module of claim 1, further comprising a fourth port group comprising at least one port, wherein each port in the fourth port group is configured for connecting with a public network of computing devices, and the control unit is configured for:
    assigning a unique port ID comprising a source chip ID and a port number combination to each port in the fourth port group;

enabling communication of data frames, based on at least in part VIDs therein, between ports in the fourth port group, and between a port in the fourth group and the control unit; and preventing communication of data frames between a port in the fourth port group and a port in the first or second port groups.

10. A video device comprising:
a camera;
a storage unit in communication with the camera for storing data frames recorded by the camera;
a server for controlling the camera and the storage unit, and for accessing and transmitting the stored data frames; and
a port unit configured for: (i) receiving a layer-independent virtual local area network ID (VID), and (ii) testing if a data frame received at that source port includes a tag and, only if a tag is not included, modifying a data frame to be transmitted by the camera by including in the data frame a tag comprising both the layer-independent VID and a unique port ID that is based on a source chip ID and a source port number.

11. The video device of claim 10, further comprising a switching module comprising:
a first port group comprising the port unit and a second port group, the switching module being configured to route the modified data frame to a destination port in the second port group if a unique port number assigned to the destination port is associated with the VID in a routing table assigned to the port unit.

12. The video device of claim 11, wherein the switching module further comprises:
a control unit for assigning a unique port number to each port in the first and second port groups, and assigning to each port in the first port group a routing table including at least one VID and at least one destination port number associated with the at least one VID,
wherein the camera is connected to the switching module using the port unit.

13. The video device of claim 12, wherein the server receives control information via a port of at least one of the first port group and the second port group, and in response to the received control information controls the control unit.

14. The video device of claim 11, wherein the first port group comprises at least one secondary port, and at least one data source is connected to the at least one secondary port.

15. The video device of claim 14, wherein the at least one data source is a video camera.

16. A method for operating an IP network, comprising a switching module comprising a first port group comprising at least one port, a second port group comprising at least one port, and a control unit, the method comprising the steps of:
assigning from the control unit a unique port number to each port in the first and second port groups;
assigning from the control unit each port in the first port group a routing table including at least one layer independent virtual local area network ID (VID) and at least one destination port number associated with the at least one VID;
storing at a first port of the first port group a security parameter corresponding to a data source in communication with the first port;
locking down the stored security parameter at the first port;
authorizing by the first port a data frame transmitted by the data source by comparing the locked and stored security parameter with a parameter subsequently received from the data source;

modifying by the first port the authorized data frame by including therein a tag comprising a layer independent VID;
routing the modified data frame to a destination port in the second port group, if a unique port number assigned to the destination port is associated with the layer independent VID in a routing table assigned to the first port; and
transmitting by the destination port a data frame modified by at least one port in the first port group to a receiver in communication with the at least one port in the second port group;
determining that an unauthorized device is in communication with the first port of the locked and stored security parameter and the subsequently received parameters mismatch; and
disabling the first port from one or more port groups for a predetermined period to prevent data transmission from the unauthorized device in response to determining that an unauthorized device is in communication with the first port.

17. The method of claim 16, wherein both the locked and stored security parameter and the subsequently received security parameter are encrypted.

18. The method of claim 16, further comprising the steps of preventing transmission of an unauthorized data frame; and
communicating the unique port number of the port receiving the unauthorized data frame to the control unit for blocking access through the port.

19. The method of claim 16, wherein:
the security parameter corresponding to the data source in communication with the first port comprises a device source number of the data source;
the unique port number of the at least one port in the first port group comprises a switch ID and port ID combination; and
the unique port number of the at least one port in the second port group comprises a different switch ID and port ID combination.

20. The method of claim 16, wherein the security parameter is a randomly generated key.

21. The method of claim 16, wherein the security parameter is a pair comprising a number of packets ingressed and a number of packets egressed during a certain time period.

22. The method of claim 16, further comprising reporting a violation in response to determining that an unauthorized device is in communication with the first port.

23. The method of claim 22, wherein reporting comprises sending an alert to an administrator.

24. The method of claim 22, wherein reporting comprises sending untrusted data frames to an administrator.

25. The switching module of claim 1, wherein each source port in the first port group is further configured to include in the tag included in the corresponding data frames a unique port number assigned to that source port.

26. The switching module of claim 1, wherein the destination port is adapted to:
remove the tag in the modified data frame; and
transmit the data frame after removal of the tag therein to the receiver.

27. The switching module of claim 1, wherein the destination port is adapted to:
preserve the tag in the modified data frame; and
transmit the modified data frame including the tag to the receiver.

28. The switching module of claim 27, wherein the receiver comprises at least one of a host computer and a second switching module.

29. The switching module of claim 1, wherein the second port group comprises at least two destination ports, a first destination port being adapted to remove the tag in data frames received thereby, and a second destination port being adapted to preserve the tag in data frames received thereby.

30. The switching module of claim 1, further comprising a fifth port group comprising at least one source port wherein each source port in the fifth port group is configured for:
(i) receiving from a source in communication with the source port a data frame comprising a tag comprising a layer independent virtual local area network ID (VID), and
(ii) routing the received data frame to a destination port in the second port group if a unique port number assigned to the destination port is associated with the layer independent VID in a routing table assigned to the source port.

31. The switching module of claim 30, wherein the source comprises at least one of a host computer and a second switching module.

32. The switching module of claim 30, wherein at least one source port in the fifth group is configured for:
receiving from the source a first data frame comprising a first tag comprising a first VID; and
receiving from the source a second data frame comprising a second tag comprising a second VID, different than the first VID.

33. The switching module of claim 30, wherein:
a source in communication with at least one source port in the fifth group comprises a host computer; and
the receiver in communication with a destination port in the second group of ports comprises the host computer.

34. The switching module of claim 1, wherein:
each source port in the first port group is further configured to include in the tag included in a data frame received at that source port a unique port number assigned to that source port; and
the receiver comprises a host computer configured at least one of to record and to ratify a combination of an ID associated with the source in communication with the source port, the ID being included in the received data frame, and the unique port number included in the tag.

35. The switching module of claim 34, wherein the host computer is further configured at least one of to record and to ratify the VID included in the tag.

36. The method of claim 16, further comprising removing by the destination port the tag from the modified data frame prior to transmitting the data frame to the receiver.

37. The method of claim 16, further comprising:
receiving by a second port in the first port group a data frame comprising a tag comprising a layer independent VID; and
routing the data frame to a destination port in the second port group, if a unique port number assigned to the destination port is associated with the layer independent VID in a routing table assigned to the second port.

* * * * *